Patented Mar. 17, 1953

2,632,018

UNITED STATES PATENT OFFICE 2,632,018

HALOGEN-CONTAINING PHOSPHORUS ACIDS AND ESTERS

Gennady M. Kosolapoff, Dayton, Ohio, assignor to Monsanto Chemical Company, St. Louis, Mo., a corporation of Delaware No Drawing. Application June 22, 1948, Serial No. 34,548

12 Claims. (Cl. 260—461)

This invention relates to a method of producing organic, phosphorus-containing compounds, and more particularly to new, halogen-containing phosphoric acid and ester products.

Among the objects of the present invention is the provision of phosphorus organic compounds possessing particular value as chemical adjuvants to be added to oils and greases. Since sulfur may also be introduced into such products, various functions may be accomplished in the modification of lubricants.

The phosphorus-containing products obtained by the present invention are also useful as plasticizers. In this respect such products have the advantage of being free of metal salt contaminants.

An object of the invention is to secure halogenated, mono-aromatic phosphorus compounds in considerably greater yield than was possible by prior methods, and to make available the halogenated, poly-aromatic substituted phosphorus products which could not be obtained by previous methods such as the Friedel-Crafts reaction.

Another object of the invention is to provide phosphorus organic compounds free from aluminum chloride. This aluminum compound forms an organic complex normally remaining bound in some degree in Friedel-Crafts reaction products despite the most careful washing. The particular complex of aluminum chloride with phosphine halides is especially troublesome because of the formation of exceedingly stable acid aluminum salts of the resultant phosphorus acids, so that the usual process of hydrolysis fails to obtain the phosphorus acid in yields anywhere near the theoretical.

Aromatic compounds having long side chains are also reacted more successfully by the process of the invention so that products not commercially obtainable by other methods may now be manufactured. Other objects of the invention will be apparent from the following description.

It has now been found that the reaction of aromatic compounds with phosphorus trichloride, catalyzed by aluminum chloride, may be improved by treatment of the foregoing reaction products with elemental chlorine. Whereas the direct reaction without chlorine proceeds to yields of 5% to 25% of mono-aromatic phosphorus compounds without the production of any diaromatics, it has been discovered that the practice of the invention using gaseous chlorine applied to the unseparated, initial reaction mixture results in greatly increased yields. I have obtained yields of about 80% of the esters of mono-aromatic phosphonic acid and up to 30% of the diaromatic derivative. The chlorination process may be carried out in the presence of a solvent indifferent to chlorine. The process of this invention serves not only to increase the valence of the phosphorus, but also to provide greater yields of the aromatic derivatives, free from aluminum salts.

Chlorination may be carried to the stage of transforming all of the trivalent phosphorus to pentavalent phosphorus or to intermediate stages where both trivalent and pentavalent phosphorus is present. The chlorination may also be continued if desired to effect further addition or substitution.

In the further separation of the pentavalent phosphorus compounds resulting from the process, I may form esters or thio-esters by the use of alcohols or mercaptans, respectively. The esters or thio-esters have the advantage of providing compounds which, particularly in the lower members of the series, permit the product to be removed by distillation. The alcohols or mercaptans may be any of the alkyl series such as methyl, ethyl, propyl, isopropyl, n-butyl, isobutyl, sec.-butyl, tert.-butyl, n-amyl, isoamyl, tert.-amyl, n-hexyl, cyclohexyl, n-octyl, capryl, n-decyl, lauryl, myristyl, cetyl, stearyl and also benzyl.

The hydrocarbons contemplated for reaction to form a substituted phosphorus-hydrocarbon bond with phosphorus trichloride in the initial reaction may be aliphatic or aromatic. As representative of the latter there may be employed benzene, mono-chlorbenzene, o-, m-, and p-dichlorbenzene, and other halogenated compounds of benzene, alkyl benzene, naphthalene, alkylated naphthalene, terphenyls, etc. The terphenyls may include pure compounds or mixtures commercially obtained as shown in U. S. Patent 2,344,258.

The products contemplated in the present disclosure comprise halogenated aromatic derivatives (R and R') of PCl₃ and the acids, Phosphonic acid

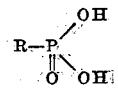

Phosphinic acid

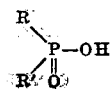

and esters of these compounds. The corresponding sulfur analogs are:

Thiophosphonic acid

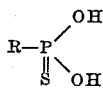

Thiophosphinic acid

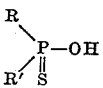

and thio-esters of these compounds where R and R' are alkyl, halo-alkyl or halo-aryl radicals, which may be further substituted as described above.

The following examples illustrate the general procedure and type of reaction without limiting the scope of the invention:

*Example 1*

To prepare the mono-chlorobenzene substituted phosphorus chloride and esters of the acid, I reacted 112.6 parts chlorobenzene, 548.4 parts PCl₃ and 200 parts AlCl₃ under reflux for 40 hours. The excess PCl₃ was removed and chlorination of the residue with ice-cooling was carried out in 200 parts tetrachlorethane, chlorine being added to saturation. After removal of excess chlorine, 230 parts ethanol were added with the resultant evolution of HCl. The residue was poured on a mixture of ice and HCl, and the ethyl esters washed free of Al salts. The yield was 82.6% of diethyl p-chlorobenzene phosphonate, b. p. 118–121° at 1–2 mm. Hydrolysis of the ester gave the p-chlorobenzene phosphonic acid.

*Example 2*

*Preparation of 2,5-dichlorobenzene phosphonates.*—I reacted 294 parts p-dichlorobenzene, 89 parts AlCl₃ and 824 parts of PCl₃ under reflux. The excess PCl₃ was removed and chlorination of the residual material to add 45.5 parts chlorine was carried out in the cold in 300 parts of solvent. The reaction product was esterified with 461 parts of ethanol and poured onto a mixture of ice and HCl. The products obtained included the compound diethyl 2,5-dichlorobenzene phosphonate, a colorless liquid, B. P. 160–164° at 3 mm., $n_D^{25} = 1.5105$. The ester was then hydrolyzed by refluxing with concentrated HCl, and the separated acid filtered off and recrystallized to give a product having a melting point of 192–195.5° and which was readily soluble in alcohol. Analysis gave 12.75% P and 30.4% Cl; theory, 13.65% P, 31.24% Cl.

*Example 3*

147 parts o-dichlorobenzene, 412 parts of phosphorus trichloride and 133 parts of aluminum chloride were treated as in Example 1, giving 37% diethyl 3,4-dichlorobenzenephosphonate, B. P. 152–156° at 3 mm. and 2% of ethyl bis-(o-dichlorobenzene)phosphinate, B. P. 210–215° at 1.5 mm.

*Example 4*

112.6 parts chlorobenzene, 172 parts phosphorus trichloride and 44.4 parts of aluminum chloride were reacted as in Example 1, but 333 parts of butanol were used for esterification. There were obtained: 16.6% of dibutyl p-chlorobenzenephosphonate, B. P. 188° at 5 mm., and 30.6% butyl bis-p-chlorobenzenephosphinate, B. P. 227–228° at 5 mm.

In the same manner as set forth above, the meta-dichlorobenzene may be reacted to obtain the respective phosphonates and phosphinates. The esterification may be carried out with the alcohols or mercaptans referred to above, and the resultant esters may also be hydrolyzed to obtain the acids themselves.

The step of chlorinating is employed on the unseparated reaction mixture resulting from the preliminary Friedel-Crafts reaction. It has been found that it is particularly desirable to carry out such chlorination directly on the unseparated material, since it is only in this manner that the complex of the organic material and the Friedel-Crafts catalyst may be decomposed to achieve yields approaching the theoretical. The chlorination step employs elemental chlorine, which is readily supplied to the reaction mixture by passing gaseous chlorine into the mixture.

The present invention is likewise applicable to other halogen substituted hydrocarbon compounds. In particular the bromobenzenes are preferred in the above process to obtain bromophosphorus compounds.

Various other modifications in the operation exemplified in the above illustrations are also feasible. Although the reaction is described as being brought about at atmospheric pressure, it is quite possible to use higher or lower pressures. When the higher pressures are employed a pressure vessel may be utilized and higher reaction temperatures are also possible. With such extreme conditions reaction takes place even more readily. The proportions of the mono- and di-aromatic substituents corresponding to the phosphinate and phosphonate compounds may also be controlled to some extent by the relative proportions of the reagents which are employed. In general, the reaction may be carried out by the use of heat to achieve a higher temperature, although the step of heating is not always necessary, but merely aids in the acceleration of the chemical reaction to form the phosphorus-organic derivative.

In view of the above discussion, it is apparent that the process of the invention employs a preliminary Friedel-Crafts reaction which may be carried out with or without the aid of heating, and which involves essentially the chlorination of the entire Friedel-Crafts reaction mixture in order to derive the pentavalent phosphorus compounds while concomitantly breaking down the complex of the catalyst with the organic reactants.

Other Friedel-Crafts catalysts well known in the art, may be employed in place of aluminum chloride, but the low cost of this material makes it preferable as a catalyst.

It is evident from the foregoing examples that my process will produce products not obtainable by the prior art Friedel-Crafts reaction, but will produce new and useful results not heretofore recognized as obtainable.

It is feasible in the light of the present disclosure to make various modifications in the operation which has been described above. Although the reaction as described is brought about at atmospheric pressure, it is quite possible to use higher or lower pressures. When the higher pressure is used, a pressure vessel may be employed and higher reaction temperatures used. With such extreme conditions reaction takes place even more readily and modifications may be made to obtain preferential quantities of one or the other reactant.

In view of the above, it will be seen that the several objects of the invention are achieved and other advantageous results obtained.

The present patent appliction is a continuation-in-part of a copending application, Serial No. 673,602, filed May 31, 1946, now Patent No. 2,594,454.

Since many changes could be made in the above methods and products without departing from the scope of the invention, it is intended that all matter contained in the above description shall be interpreted as illustrative and not in a limiting sense, and that the invention is to be construed broadly and is not to be limited to the specific processes and compositions herein described, or specifically covered by the claims except insofar as such limitations are specified in the appended claims.

What I claim and desire to secure by Letters Patent of the United States is:

1. The method of preparing a phosphorus-containing organic compound which comprises reacting a chlorinated, aromatic hydrocarbon with phosphorus trichloride and aluminum chloride, chlorinating said mixture with elemental chlorine to decompose complexes, and separating the phosphorus-containing compounds.

2. The method of preparing a phosphorus-containing organic ester which comprises reacting a chlorinated aromatic hydrocarbon with phosphorus trichloride and aluminum chloride, chlorinating said mixture with elemental chlorine, and esterifying the phosphorus-containing compound.

3. The method of preparing a phosphorus-containing organic compound which comprises reacting a chlorinated, aromatic hydrocarbon with $PCl_3$ and $AlCl_3$ to form trivalent phosphorus compounds and complexes of the same with $AlCl_3$, chlorinating said mixture with elemental chlorine in the presence of a solvent to decompose said complexes and to form pentavalent phosphorus derivatives, and separating the mono- and di-aromatic phosphorus compound.

4. The process for preparing aryl substituted pentavalent phosphorus acids which comprises reacting a di-chlorinated, aromatic hydrocarbon with phosphorus trichloride and aluminum chloride, chlorinating said mixture with elemental chlorine to obtain pentavalent phosphorus compounds, esterifying and separating the phosphorus acid esters, and hydrolyzing to obtain the free acids.

5. Compounds having the general formula:

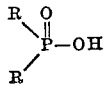

where R is a halogenated, aromatic hydrocarbon radical.

6. As a composition of matter a diaromatic, phosphinic acid in which the aromatic radical contains two chlorine substituents.

7. 3,4-dichlorobenzene phosphonic acid.

8. Bis-(o-dichlorobenzene) phosphinic acid.

9. p-Dichlorobenzene phosphonic acid.

10. Compounds having the general formula:

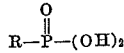

where R is a dichloro, aromatic hydrocarbon radical.

11. Compounds having the general formula:

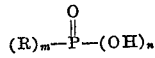

where R is a dichloro, aromatic hydrocarbon radical, $m$ is a positive whole number less than 3, and $n$ is a positive whole number less than 3 and the sum of $m$ and $n$ is equal to 3.

12. Compounds having the general formula:

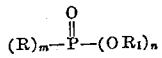

where R is a dichloro aromatic hydrocarbon radical, $R_1$ is a radical selected from the group consisting of hydrogen and alkyl radicals, $m$ is a positive whole number less than 3, and $n$ is a positive whole number less than 3 and the sum of $m$ and $n$ is equal to 3.

GENNADY M. KOSOLAPOFF.

REFERENCES CITED

The following references are of record in the file of this patent:

UNITED STATES PATENTS

| Number | Name | Date |
|---|---|---|
| 2,347,633 | Kosolapoff | Apr. 25, 1944 |
| 2,453,167 | Toy | Nov. 9, 1948 |

OTHER REFERENCES

Michaelis—"Annalen der Chemie"—vol. 293—(1896) pp. 223–226.

Arbusow—"Chem. Centralblatt"—vol. 1910 II—pp. 453–454.

Ludvik et al.: J. Econ. Entomol; vol. 40, pp. 97–100 (Feb. 1947).

Toy—"Jour. Am. Chem. Soc."—vol. 70 (Jan., 1948)—pp. 186–188.